United States Patent

[11] 3,597,935

| [72] | Inventor | Michel A. Pierrat<br>Andover, Mass. |
|---|---|---|
| [21] | Appl. No. | 29,871 |
| [22] | Filed | Apr. 20, 1970 |
| [45] | Patented | Aug. 10, 1971 |
| [73] | Assignee | Automatic Radio Mfg. Co., Inc<br>Melrose, Mass. |

[54] AUTOMOTIVE AIR CONDITIONING
12 Claims, 10 Drawing Figs.

[52] U.S. Cl. .................................................... 62/243,
 62/244
[51] Int. Cl. .................................................... B60h 3/04
[50] Field of Search ........................................ 62/243, 244

[56] References Cited
UNITED STATES PATENTS

| 2,480,510 | 8/1949 | Roper .................... |  | 62/244 |
| 2,771,750 | 11/1956 | Oldberg .................. |  | 62/239 |
| 3,381,493 | 5/1968 | Dixon ..................... |  | 62/244 |
| 3,449,924 | 6/1969 | Ludmeier ................ |  | 62/244 |
| 3,494,540 | 2/1970 | Dixon ..................... |  | 62/244 |

*Primary Examiner*—William J. Wye
*Attorneys*—James E. Mrose and Mary C. Thomson ABSTRACT: A self-contained factory-assembled and sealed air-conditioning unit is arranged for inconspicuous floor-mounted installation at the rear of the passenger compartment of a compact car, forwardly of the firewall ahead of a rear engine. The usual separate conditioned-air circulation path is provided at the top of the relatively small unit, in sealed relation to lower coolant-air paths running between laterally spaced bottom openings which communicate with corresponding floorboard openings for intake and discharge of ambient coolant air. Major power requirements, for the compressor and for a fan associated with the coolant-air path, are efficiently satisfied by a single universal-jointed mechanical coupling with an auxiliary power shaft extending forwardly from a pulley-driven relationship with the rear engine. Auxiliary ducting, body openings, separate sources of power for the compressor and fan, separate installations of system components, and disturbance of sealed refrigerant lines, are all advantageously avoided.

Patented Aug. 10, 1971

INVENTOR:
MICHEL A. PIERRAT by Thomson & Mrose
ATTORNEYS

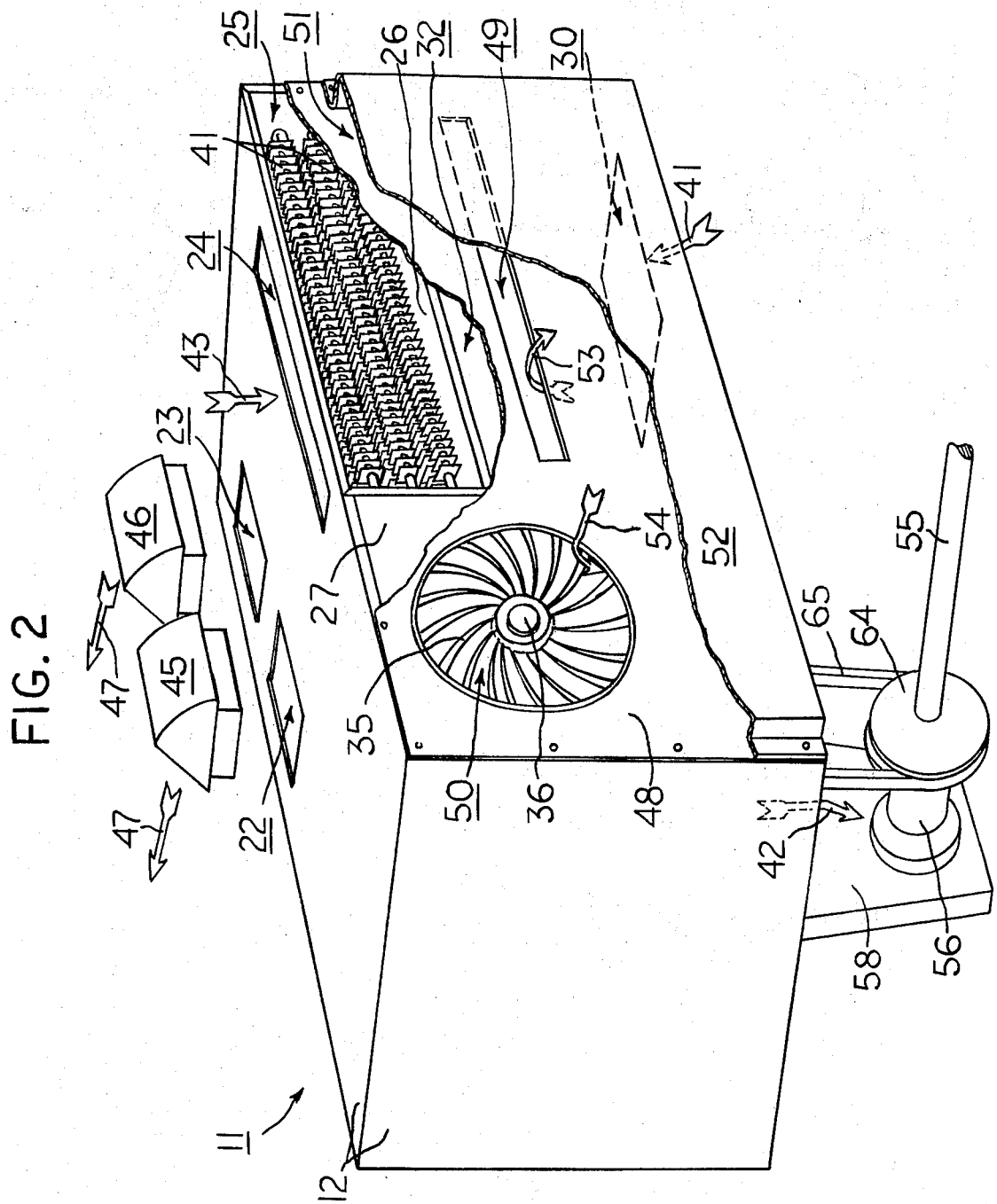

Patented Aug. 10, 1971 3,597,935

INVENTOR:
MICHEL A. PIERRAT
by Thomson & Mrose
ATTORNEYS

Patented Aug. 10, 1971
3,597,935
4 Sheets-Sheet 4
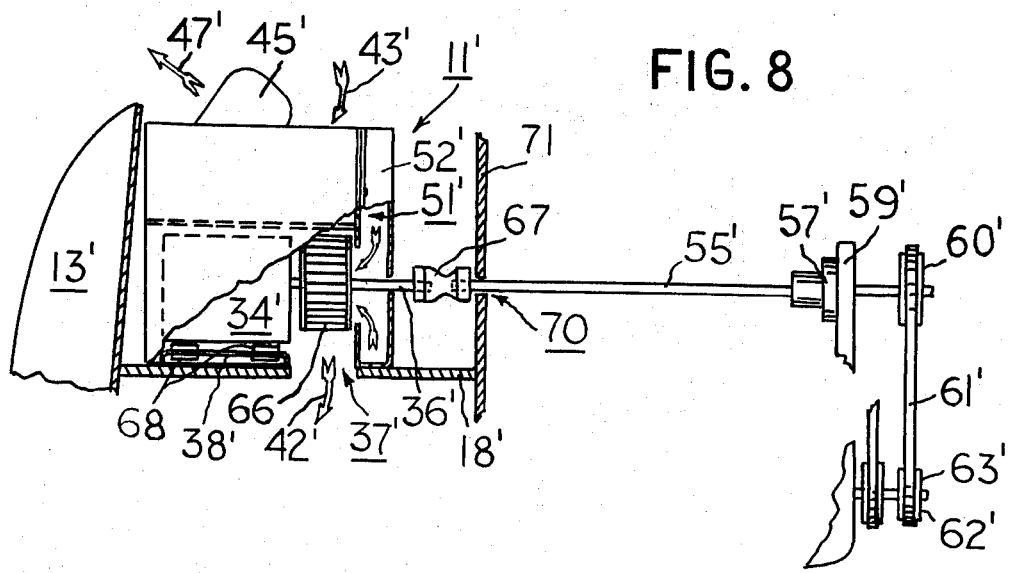
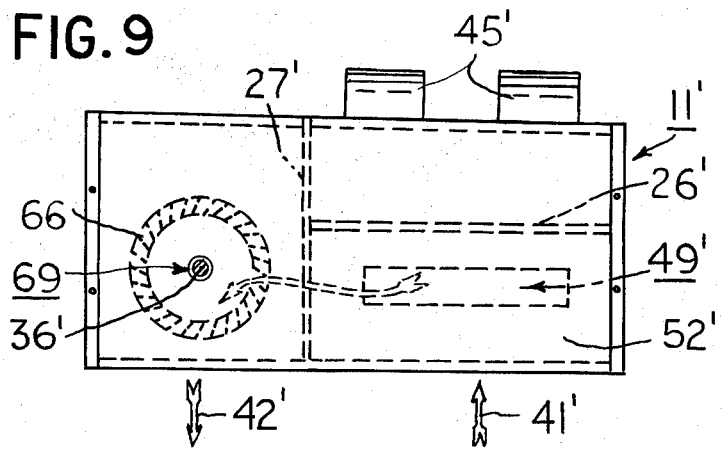
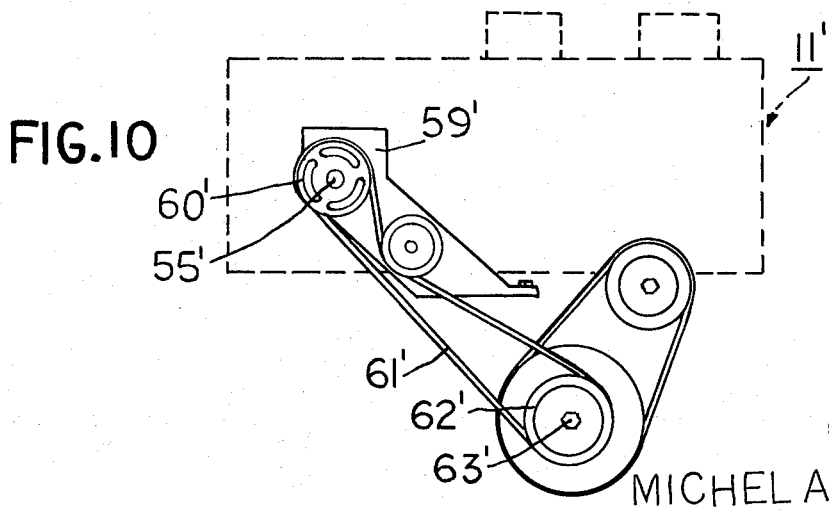
INVENTOR:
MICHEL A. PIERRAT
by Thomson & Mrose
ATTORNEYS

AUTOMOTIVE AIR CONDITIONING

BACKGROUND OF THE INVENTION

Modern air-conditioning systems are of a basically common and simple type involving a power-driven refrigerant compressor, a condenser in which the pressurized gaseous refrigerant is caused to liquefy and release heat, and an evaporator wherein the liquid refrigerant returns to a gaseous state and absorbs heat. Adaptations of such systems to the automotive environment, for the purpose of improving rider comfort, have involved many difficulties not encountered in other uses. In particular, electrical power requirements for operation of an electrically motorized compressor and condenser fan are very severe, and aggravate the battery and generator problems which can be expected in automobiles already well stocked with electrically operated equipment. Intricate proposals for resorting to an auxiliary internal-combustion engine or a hydraulic drive to rotate the compressor evidence the severity of these power problems. The seemingly attractive alternative of driving the compressor via the main engine itself gives rise to complications with the installation of the compressor, which must then be mounted next to the engine and must have its refrigerant lines skillfully connected to a remote condenser and evaporator. Dissipation of heat by the remote condenser may be promoted by its installation in the vicinity of fan-augmented air intake for the radiator of a water-cooled engine, but such mounting is not possible with air-cooled engines, even if the difficulties associated with related custom piping for the refrigerant could be tolerated. The same problems, involving the costly and complicated installation of piping and the technically sophisticated evacuation, charging and sealing of refrigerant paths, are encountered when the evaporator is separately installed in its different association with the passenger compartment. Moreover, the engine compartments of compact cars afford little space to accommodate bulky air conditioner components, and engine heat develops a further environmental handicap for such components. prior techniques which require the installations of special ducting and insulation, and which involve visible openings or other body modifications, tend to be expensive, time- consuming, and demanding of a high degree of training. Reference may be had to the following U.S. patents in connection with certain of the known practices which have been mentioned: U.S. Pat. No. 2,294,036 issued Aug. 25, 1942, to C. F. Kettering; U.S. Pat. No. 2,630,687 issued Mar. 10, 1953, to R. D. Action; U.S. Pat. No. 2,753,696 issued July 10, 1956, to J. P. Guerra et al. U.S. Pat No. 2,804,756 issued Sept. 3, 1957, to J. W. Faulhaber et al. U.S. Pat. No. 2,743,589 issued May 1, 1956 to L. L. Kuempel; and U.S. Pat. No. 2,989,854 issued June 27, 1961 to R. E. Gould.

SUMMARY OF THE INVENTION

Accordingly, it is one of the objects of the present invention to provide novel and improved automotive air-conditioning system apparatus of unitized factory-sealed construction which is economical to manufacture and install in an optimum floor-mounted location isolated from the engine compartment of a compact car, which admits and discharges ambient coolant air through floor openings of the car, and which conserves electrical power through a single mechanical coupling of a compressor and compressor-mounted coolant fan with the car engine.

Another object is to provide a unique automobile air conditioner of compact prepackaged sealed form having coolant-air inlet and outlet openings at the bottom and an upper evaporator chamber isolated from the coolant-air chamber below, the unit as a whole being advantageously arranged for deck mounting forwardly of a rear engine with which it is connectable by way of a simple mechanical coupling.

It is a further object to provide a novel and improved compact mechanically driven automobile air conditioner lending itself to economical manufacture and to ready installation without disturbing assembled and factory-sealed major refrigeration components.

Still further, an object of the invention is to provide a highly efficient prefabricated low-cost assemblage of automotive air-conditioning elements self-contained within a single housing which is internally partitioned and panelled to form ducts and chambers for two main air-circulation streams, the condenser air-coolant stream being associated with an inlet and outlet at the bottom of the unit for purposes of coupling with ambient air through simple deck openings.

It is another object to provide a unique automotive air conditioner in which critical electrical power drain is minimized through universal-jointed simple mechanical drive, from a rear engine, of the compressor and condenser fan of a prefabricated full air conditioner unit which is floor mounted and circulates its coolant air through inconspicuous floor openings.

The foregoing and other objects are attained in the prefabricated air conditioner unit wherein a lightweight housing of generally rectangular configuration is internally subdivided into three principal partitioned chambers; one, near the top, accommodates conventional evaporator coils and an associated low-power blower which both forces conditioned air upwardly out of the top openings and draws air inwardly and thence across the coils via another spaced top opening; a second, below the first, accommodates condenser coils above a bottom opening which serves as an inlet for coolant air from below; and a third, laterally beside the other two, is also open at the bottom and is occupied by a substantially conventional form of refrigerant compressor which, however, mounts a centrifugal fan on its drive shaft. Panelling affixed along one side of the housing provides ducting for forced guided passage of the coolant air from the second chamber to the midportion of the fan in the third, such that optimum forced flow of the coolant air across the condenser coils will result from efficient pumping action of the centrifugal fan. The aforementioned housed assemblage of fixedly related refrigeration-system components, having its refrigerant piping fully charged and sealed, is mounted above floor or deck openings at the rear of a compact-car passenger compartment, with the bottom openings in registry with the car floor openings, such that coolant air may be drawn upwardly from below and discharged downwardly. The top inlet and conditioned-air outlet openings communicate with the rear interior of the passenger compartment, the latter preferably by way of flow directors. Powering of the shaft which drives both the compressor and centrifugal fan is achieved by a simple mechanical coupling with the rear engine shaft, via an auxiliary external engine-mounted pulley-driven shaft including universal jointing which allows for slight mechanical misalignment of that auxiliary shaft with either the compressor shaft or a pulley drive for that compressor shaft, depending upon which is used.

BRIEF DESCRIPTION OF THE DRAWINGS

Although the aspects of this invention which are believed to be novel are set forth in the appended claims, additional details as to preferred practices and as to the further advantages, objects and features of the invention may be most readily comprehended through reference to the following description taken in connection with the accompanying drawings, wherein:

FIG. 2 provides a perspective view, with panel portions broken away to reveal internal constructional features, of a prefabricated automobile air conditioner unit such as that illustrated in FIG. 1;

FIG. 8 provides a side view of an alternative unit in which the compressor and fan drive shaft is aligned with an auxiliary engine-driven auxiliary power shaft;

FIG. 9 views the unit of FIG. 8 from the front, with the auxiliary power shaft coupling disconnected; and FIG. 10 represents engine-driven pulley and auxiliary power shaft relationships with an engine shaft.

DESCRIPTION OF THE PREFERRED EMBODIMENTS

Figure 1:
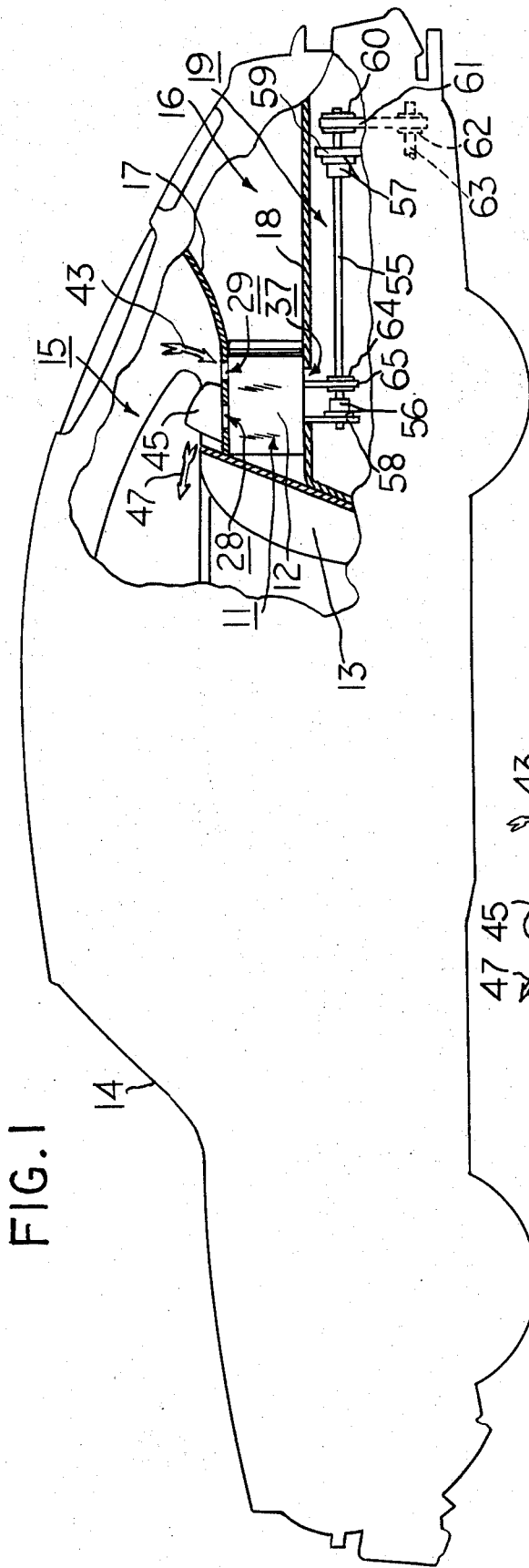
FIG. 1 portrays a compact-automobile outline, broken away to expose details of the installation and mechanical drive of an improved prefabrication air conditioner unit by a rear engine.
Figure 5:
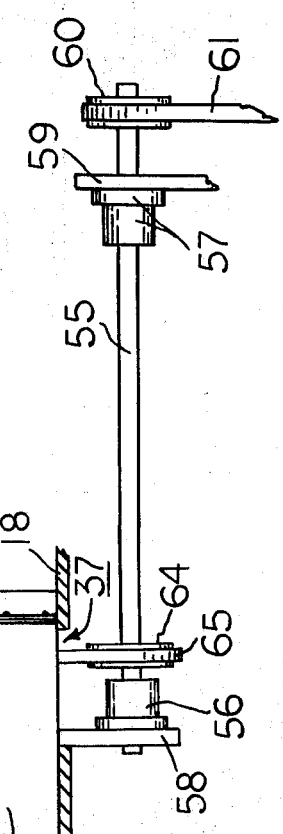
FIG. 5 depicts the same unit in association with an auxiliary engine-driven universal-jointed power shaft.
Figure 3:
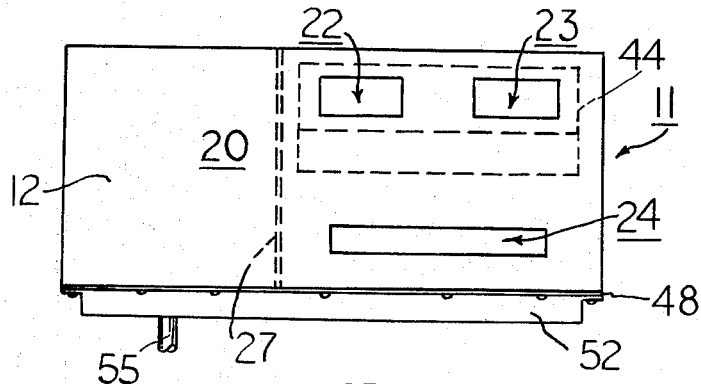
FIG. 3 is a plan view of the unit of FIG. 2.
Figure 4:
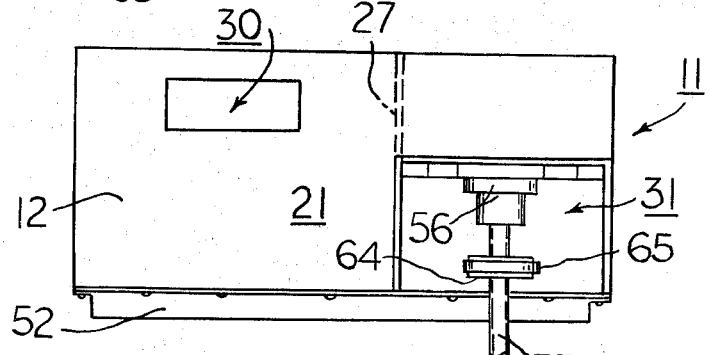
FIG. 4 is a view of the underside of the unit of FIGS. 2 and 3.
Figure 6:
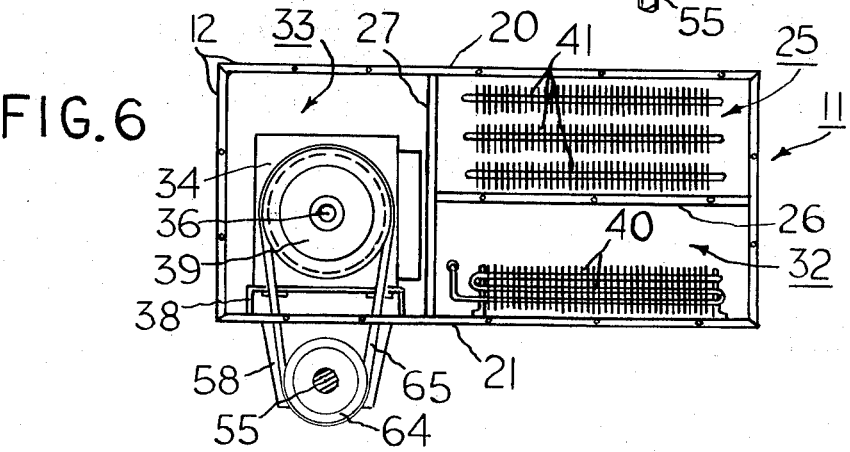
FIG. 6 shows the front of the air conditioner unit of FIGS. 2—4, with all front duct panelling, and the compressor-mounted fan, removed.
Figure 7:
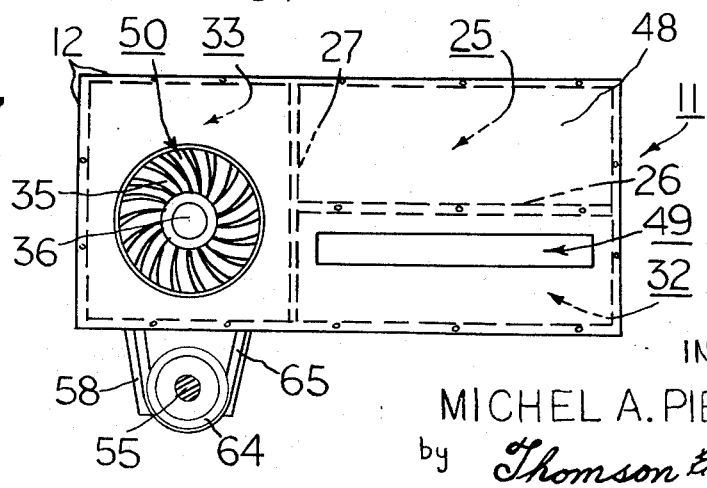
FIG. 7 depicts the front of the unit of FIG. 6, with an inside front duct panel and the compressor-mounted fan in place.

The improved air-conditioning unit 11 appearing in FIGS. 1 through 7 includes a prefabricated refrigeration system within a sheet metal housing 12 which has the general external form of a rectangular parallelepiped, and which, as shown in FIG. 1, is of proportions enabling it to be conveniently located directly behind the rear seat, 13, of a compact passenger car, the outline 14 of which is that of a so-called fastback styling. Passenger compartment 15 of the illustrated style of automobile is separated from a rear trunk space 16 by way of a lightweight partitioning 17, and the rear floor or deck 18 below it overlies the engine compartment 19 for a conventional air-cooled rear internal combustion engine (not shown). The latter deck extends forwardly to the rear of the rear seat 13, and affords a mounting for the unit 11 via any convenient securing means such as bolts (not shown). Top and bottom surfaces, 20 and 21 respectively, of the conditioning unit 11 are adjacent to the partitioning 27 and floor 18, and are provided with certain airflow openings which are in registry with corresponding openings in the partitioning and floor. Having reference to FIGS. 2 and 3, for example, there are two similar laterally spaced outlet openings 22 and 23 nearer the forward side (forward in relation to fore-and-aft directions of the car in which the unit is installed), and a third inlet opening 24 nearer the rear side. All three of these three openings communicate with an evaporator or cooling chamber 25, FIGS. 2 and 6, subdivided within the unit by suitable lightweight horizontal and vertical partitions 26 and 27. In FIG. 1, openings 28 and 29 through the partitioning 17 correspond to and are in registry with unit openings 23 and 24. Bottom surface or panel 21 for the conditioner is provided with a pair of laterally spaced intake and discharge airflow openings, 30 and 31, respectively, the intake being toward the front (FIG. 4) and in association with a condenser chamber 32 also sub divided within the unit by the aforementioned partitions 26 and 27, and the discharge opening 31 being associated with the remaining chamber 33 occupied by/ compressor 34 (FIG. 6) and a centrifugal fan 35 (FIGS. 2 and 7) mounted on the compressor shaft 36. These two openings are in registry with corresponding openings through the deck, or floor 18 of the vehicle equipped with the unit, one of which, 37, is shown in FIGS. 1 and 5 for the discharge of air from unit opening 31.

Each of the three chambers 25, 32 and 33 of the prepackaged unit 11 includes major components of the refrigeration system, and all are physically mounted and charged with refrigerant and sealed upon manufacture, such that, advantageously, no disturbance or related technically skilled installation operations are required. Refrigerant compressor 34 in chamber 33 is preferably ruggedly mounted in vibration-isolated relation to a support 38 (FIG. 6) which may in turn be bolted or otherwise be secured to the car deck; the compressor is to be mechanically driven by the engine, via a pulley 39, and the relatively direct bolting to the car floor renders it largely independent of the less rugged construction of the sheet metal housing for the unit. In the usual manner, refrigerant gas under high pressure, from the compressor, is passed to vaned condenser coils 40 (FIGS. 2 and 6) located in chamber 32, where liquefaction occurs with attendant release of heat. Subsequently, the liquid refrigerant is passed to vaned evaporator coils 41 in chamber 25, where return of the refrigerant to the gaseous state is accompanied by absorption of heat prior to recycling of the refrigerant through the compressor. Importantly, the coolant air for the condenser 40 is taken from and discharged below the car, as represented by arrows 41 and 42 (FIG. 2). This occurs in advance of the heated rear engine, and the floor opening, being inconspicuous, need not be formed with particular nicety such as would be mandatory in disturbance of visible body structure. Nor are any associated external ducts required. Warmer air which is to e conditioned within the passenger compartment of the car is drawn into chamber 25 via rear opening 24, as shown by arrow 43 (FIGS. 1, 2 and 5), passes through and releases heat to the array of vaned evaporator coils 41, and is then discharged back into the passenger compartment in a cooled condition through openings 22 and 23, under influence of a conventional electrically powered blower 44 (FIGS. 3 and 5) within the chamber 25. Auxiliary flow-deflecting directors 45 and 46 may be fitted within openings 22 and 23 to direct the cooled air streams forward, as shown by arrows 47 (FIGS. 1, 2 and and 5).

The centrifugal fan 35 on the compressor shaft in chamber 33 serves to draw in the coolant air from below and across the vaned condenser coils 40. A separate power source for this important fan element is thus avoided; however, its orientation is unusual and is largely dictated by the fact that the compressor shaft must extend generally fore and aft, for purposes of optimum mechanical coupling with the engine. Resort to a separate fan and drive mechanisms, or to complicated ducting, are advantageously avoided through use of a simple cooperating double panel arrangement at the rear of the unit. In this connection, reference to FIGS. 2 and 7 explains that a first or inner rear sheet metal panel or baffle 48 closes the rear of chamber 25, closes the rear of chamber 32 except for an elongated horizontal opening 49 above the level of the condenser coils within it, and closes the rear of chamber 33 except for a circular opening 50 of lesser diameter than and aligned with the centrifugal fan 35. In turn, the inner panel 48 forms inner wall of a rear ducting chamber 51 formed when it is closed in spaced relation by a deeply recessed cover panel 52 (FIG. 2). Coolant air travel paths from condenser chamber 32 into ducting chamber 51 and from the latter into the centrifugal fan are indicated by arrows 53 and 54, respectively, in FIG. 2.

Mechanical powering of the compressor 34 and condenser fan 35 by the car engine conserves electrical power very significantly; typically, current demands may be dropped from about 20 amps. to about 9 amps. through this practice. Electrical clutching for the compressor drain (not shown), and an electric motor forming part of the blower 44, remain in the system, however. AS has been discussed hereinabove, the compressor shaft 36 is disposed generally fore and aft, such that it may be readily and simply coupled in driven relation with an auxiliary power shaft; the latter, 55, is mounted generally fore and aft on at least two spaced bearing supports, 56 and 57, both of which are preferably of known constructions affording at least limited universal-jointing movements which will accommodate small misalignments. One of these supports, 56, is mounted on a forward bracket 58 secured to the unit 11 itself, preferably a firmly fixed relation to the compressor 34 and its support 38. The other, 57, is held by a rear bracket 59 secured to the engine block (not shown). Rear pulley 60 on the shaft 55 is rotated by a belt 61 engaged with a cooperating pulley 62 at the rear of the engine shaft 63 (FIG. 1), after the manner common to belt-driven alternators. Forward pulley 64 on the same shaft rotates the compressor pulley 39 via a suitable belt 65. Installation of shaft 55 and its associated mounts and belting involves exercise of but the basic skills of an automobile mechanic.

The embodiment appearing in FIGS. 8 through 10 has most aspects in common with the preceding embodiment, and those units, features and components which are structurally or functionally the same are identified by the same reference characters, distinguished by a single-prime accent. The air conditioner unit 11' is shown to include a squirrel-cage-type fan 66 on the compressor shaft, serving the same purpose as fan 35. Compressor, evaporator and condenser components within housing 11' are connected in the same refrigeration-circuit relationship as described for the embodiment of FIGS. 1 through 7. A principal difference is found in the coupling of the auxiliary power shaft 55' in driving relation to the compressor shaft 36; specifically, the two shafts are aligned, and are connected by way of a universal coupling 67. Such couplings are well known, and a preferred form includes spaced rigid metal connector elements bonded with an intermediate sturdy but somewhat flexible rubber mass. Further mechanical accommodation is afforded by somewhat flexible shock mounts 68 for the compressor on its support 38'. This type of drive eliminates certain bracket, pulley and belting features such as those described in connection with the first embodiment, and requires that only relatively small openings 69 and 70 be provided in the cover panel 52' and in the engine compartment firewall 71 to enable the compressor shaft to be passed through it. The entire unit 11' nests inconspicuously in the usual space between the rear seat 13' and firewall 71 of a conventional Volkswagen sedan, for example. In that type of vehicle, the rear engine (not shown) is so disposed in relation to the deck 18' that the auxiliary power shaft may be readily bracketed and pulley driven at the required height for alignment with the compressor shaft, as represented in FIG. 10. Shaft coupling 67 may be disposed at any convenient alternative position, such as rearwardly of the firewall 67, or partly within the unit housing.

Insulation may be applied to or included in the partitions of the air conditioner unit, to suppress unwanted heat transfers and noise. In those applications where the advantages of factory sealing of the system must yield to the interests of providing a remote evaporator and blower unit, near the front of the passenger compartment, for example, it can nevertheless prove beneficial to utilize the mechanical drive for an improved compressor-condenser package of the type described. Those skilled in the art will appreciate that various substitutions, modifications and additions may be effected without departure from these teachings, and that the descriptions of specific embodiments herein are intended to serve the purposes of disclosure rather than to establish limitation. Accordingly, it should be understood that the invention may be practiced otherwise than as specifically described, within the scope of the appended claims.

What I claim as new and desire to secure by Letters Patent of the United States is:

1. Automotive air-conditioning apparatus comprising a housing having bottom surfaces disposed for mounting upon the floor of an automobile, said surfaces having a pair of spaced air-inlet and -outlet openings disposed for registration with corresponding openings through the automobile floor, means partitioning the interior of said housing into three separate chambers one of which communicates directly with said inlet opening and another of which communicates directly with said outlet opening, a compressor and a fan mounted on the drive shaft for said compressor within one of said chambers, a condenser within the other of said chambers, means ducting air between said chambers in a flow stream between said inlet and outlet openings wherein air is forced across said condenser by said fan, said housing having top surfaces with spaced air-inlet and -outlet openings therethrough in direct communication with the third chamber in said housing, an evaporator and blower in said third chamber, said blower forcing air from the passenger compartment of the automobile in a flow stream across said evaporator between said inlet and outlet openings through said top surfaces, means connecting said compressor and condenser and evaporator in refrigeration-circuit relationship, an auxiliary power shaft external to said housing, means for supporting said shaft on the engine of the automobile in belt-driven relation with the engine shaft at one end of said power shaft, and means supporting the opposite end of said power shaft in relation to said compressor and connecting said opposite end in driving relation to said compressor drive shaft and the fan thereon.

2. Automobile air-conditioning apparatus as set forth in claim 1 wherein said fan comprises a centrifugal fan, wherein said compressor drive shaft extends in substantially the same direction as said auxiliary power shaft, and wherein at least one of said supporting means including a bearing providing at least limited universal-jointed freedom for movements of said auxiliary power shaft.

3. Automobile air-conditioning apparatus as set forth in claim 11 wherein said housing is arranged for floor mounting near the rear of a rear-engine automobile ahead of the said engine with said air-inlet and -outlet openings associated with said bottom surfaces being spaced laterally in relation to fore-aft directions of the automobile, and wherein auxiliary power shaft and compressor shaft extend in said fore-aft directions.

4. Automobile air-conditioning apparatus as set forth in claim 3 wherein said air inlet and outlet openings through said top surfaces are spaced from one another in said fore-aft directions, wherein said other of said chambers containing said condenser underlies said third chamber containing said evaporator, and wherein said other and third chambers both laterally adjoin said one of said chambers containing said compressor and said centrifugal fan.

5. Automobile air-conditioning apparatus as set forth in claim 1 wherein said housing has the general configuration of a rectangular parallelepiped and is arranged for floor mounting near the rear of a rear-engine automobile ahead of said engine with said air-inlet and -outlet openings associated with said bottom surfaces being spaced laterally in relation to fore-aft directions of the automobile, wherein said other of said chambers containing said condenser underlies said third chamber containing said evaporator and both laterally adjoin said one of said chambers containing said compressor and fan, means mounting said compressor within said housing with the drive shaft thereof parallel with said fore-aft directions and with the fan thereof disposed near one of the front and rear sides of the housing, a first ducting panel closing said one of said sides of said housing except for laterally spaced openings therethrough directly communicating respectively with said other of said chambers and with said third chamber, and a second ducting panel overlying and covering said first panel in a spaced relation thereto which provides an internal ducting space therebetween for coolant air from below the automobile to pass between said other and third chambers.

6. Automobile air-conditioning apparatus as set forth in claim 5 wherein said one of said sides comprise a rear side of the housing, relative to said fore-aft directions.

7. Automobile air-conditioning apparatus as set forth in claim 5 wherein said fan comprises a centrifugal fan, and wherein said opening through said first ducting panel communicating with said third chamber is disposed in substantially centered relation to said centrifugal fan to admit coolant air from the said ducting space into the fan for centrifugal pumping.

8. Automobile air-conditioning apparatus as set forth in claim 1 wherein said means supporting said opposite end of said power shaft in relation to said compressor and connecting said opposite end in driving relation to said compressor shaft and fan comprises bearing means for said auxiliary shaft, a bracket fixed in relation to said compressor and mounting said bearing means below the one of said bottom openings associated with said one of said chambers, a first pulley mounted on said auxiliary shaft below said one of said bottom openings, a second pulley mounted on the compressor drive shaft, and belt means connecting said first pulley in driving relation to said second pulley.

9. Automobile air-conditioning apparatus as set forth in claim 1 wherein said means supporting said opposite end of said power shaft in relation to said compressor and connecting said opposite end in driving relation to said compressor shaft comprises a universal-joint connector securing said auxiliary power shaft substantially in axial alignment with said compressor shaft, said housing having an opening through wall surfaces of said one of said chambers accommodating passage therethrough of a rotating portion of the interconnected power shaft and compressor shaft assembly.

10. Automobile air-conditioning apparatus comprising a housing having bottom surfaces disposed for mounting upon the floor of an automobile, said surfaces having a pair of spaced air-inlet and -outlet openings disposed for registration with corresponding openings through the automobile floor, means partitioning the interior of said housing into separate chambers one of which communicates with said inlet openings and another of which communicates with said outlet opening, a compressor and a fan mounted on the drive shaft for said compressor within one of said chambers, a condenser within the other of said chambers, means ducting air between said chambers in a flow stream between said inlet and outlet openings wherein air is forced across said condenser by said fan, an evaporator connected in refrigeration-circuit relationship with said compressor and condenser, blower means for forcing air from the passenger compartment of the automobile in a flow stream which traverses said evaporator, an auxiliary power shaft, means for mounting said shaft in belt-driven relation with the engine shaft of said automobile at one end of said power shaft, and means supporting the opposite end of said power shaft in relation to said compressor and connecting said opposite end in driving relation to said compressor drive shaft and fan.

11. Automobile air-conditioning apparatus as set forth in claim 10 wherein said fan comprises a centrifugal fan, wherein said compressor drive shaft extends in substantially the same direction as said auxiliary power shaft, and wherein at least one of said supporting means includes a bearing provided at least limited universal-jointed freedom for movements of said auxiliary power shaft.

12. Automobile air-conditioning apparatus as set forth in claim 11 wherein said mounting is arranged for floor mounting near the rear of a rear-engine automobile ahead of said engine with said air-inlet and -outlet openings associated with said bottom surfaces being spaced laterally in relation to fore-aft directions of the automobile, wherein auxiliary power shaft and compressor shaft extend in said fore-aft directions, wherein said other of said chambers containing said condenser laterally adjoins said one of said chambers containing said compressor and fan, means mounting said compressor within said housing with the drive shaft thereof parallel with said fore-aft directions and with the fan thereof disposed near the rear of the housing, a first ducting member closing said rear of said housing except for laterally spaced openings therethrough directly communicating respectively with said other of said chambers and with said one of said chambers, and a second ducting member overlying and covering said first member in a spaced relation thereto which provides an internal ducting space therebetween for coolant air from below the automobile to pass between said other and third chambers.